US010697547B2

(12) United States Patent
Huang et al.

(10) Patent No.: US 10,697,547 B2
(45) Date of Patent: Jun. 30, 2020

(54) SHAFT SEALING DEVICE (71) Applicant: SCENIC PRECISE ELEMENT INC., Kaohsiung (TW)

(72) Inventors: Cheng-Hsiu Huang, Kaohsiung (TW); Tzu-Hsing Chen, Kaohsiung (TW)

(73) Assignee: SCENIC PRECISE ELEMENT INC., Kaohsiung (TW)

( * ) Notice: Subject to any disclaimer, the term of this patent is extended or adjusted under 35 U.S.C. 154(b) by 201 days.

(21) Appl. No.: 15/906,057

(22) Filed: Feb. 27, 2018

(65) Prior Publication Data

US 2018/0347703 A1    Dec. 6, 2018

(30) Foreign Application Priority Data

Jun. 6, 2017    (TW) .............................. 106118730 A (51) Int. Cl.
*F16J 15/34*    (2006.01)

(52) U.S. Cl.
CPC ....... *F16J 15/3452* (2013.01); *F16J 15/3412* (2013.01)

(58) Field of Classification Search
CPC .. F16J 15/3412; F16J 15/3452; F16J 15/3428; F16J 15/3416; F16J 15/342; F16J 15/3432; F16J 15/3424; F16J 15/3244
See application file for complete search history.

(56) References Cited

U.S. PATENT DOCUMENTS

| 5,398,943 A | * | 3/1995 | Shimizu | F16J 15/3412 277/400 |
| 5,722,665 A | * | 3/1998 | Sedy | F16J 15/3412 277/400 |
| 6,152,452 A | * | 11/2000 | Wang | F16J 15/3412 277/399 |

(Continued)

FOREIGN PATENT DOCUMENTS

| CN | 2216164 Y | * | 12/1995 |
| CN | 102313021 A | | 1/2012 |

(Continued)

OTHER PUBLICATIONS

Office Action and search report dated Apr. 25, 2018, issued in counterpart Taiwanese Patent Application No. 106118730, with English translation. (1 page).

(Continued)

*Primary Examiner* — Eugene G Byrd
(74) *Attorney, Agent, or Firm* — Juan Carlos A. Marquez; Marquez IP Law Office, PLLC (57) ABSTRACT

The present invention provides a shaft sealing device for being mounted on a rotating shaft. The shaft sealing device of the present invention includes a stationary member disposed on a housing of the shaft sealing device and having a first sealing surface; and a rotary member corresponding to the stationary member, disposed on the rotating shaft and having a second sealing surface opposite to the first sealing surface of the stationary member. A groove is disposed on (Continued)

the first sealing surface or the second sealing surface, and extends inwardly from the outer peripheral edge. When the groove extends inwardly, an end (a bottom wall) of the groove extends along a tangential direction of an imaginary circle containing the bottom wall of the groove.

15 Claims, 11 Drawing Sheets

(56) References Cited

U.S. PATENT DOCUMENTS

| | | | | |
|---|---|---|---|---|
| 6,213,472 | B1* | 4/2001 | Bondarenko | F16J 15/3412 |
| | | | | 277/399 |
| 9,765,892 | B2 | 9/2017 | Itadani | |
| 2005/0047912 | A1* | 3/2005 | Giesler | F01D 11/003 |
| | | | | 415/231 |
| 2014/0341733 | A1* | 11/2014 | Lebigre | F01D 11/04 |
| | | | | 415/231 |
| 2016/0097457 | A1 | 4/2016 | Sun et al. | |
| 2018/0172162 | A1* | 6/2018 | Tokunaga | F16J 15/34 |

FOREIGN PATENT DOCUMENTS

| | | |
|---|---|---|
| CN | 102588601 A | 7/2012 |
| CN | 103267132 A | 8/2013 |
| CN | 104235371 A | 12/2014 |
| CN | 205877184 U | 1/2017 |
| CN | 205978439 U | 2/2017 |
| JP | 10-281300 A | 10/1998 |
| JP | W2015/199171 A | 12/2015 |

OTHER PUBLICATIONS

Office Action dated Sep. 2, 2019, issued in counterpart Chinese Patent Application No. 201710447284.2, in Chinese (4 pages).
Search report dated Aug. 27, 2019, issued in counterpart Chinese Patent Application No. 201710447284.2, in Chinese (2 pages).

* cited by examiner

SHAFT SEALING DEVICE

TECHNICAL FIELD

The present invention relates to a shaft sealing device, and particularly, to a gas shaft sealing device having a sealing surface with a groove.

BACKGROUND

The existing gas shaft sealing device is provided with a groove on a sealing surface of a rotary ring or a stationary ring, peripheral gas is introduced into the sealing surface through the groove, and a sealing gap is formed between the movable ring and the stationary ring, wherein a pressurized gas film is generated due to the grooves' gas pumping effect. The sealing surfaces are kept apart from each other by dynamic and static pressures of the film to avoid contact or wear between the sealing surfaces.

However, based on the prior art, the pressure distribution of the introduced gas, or fluid mechanics effects, may be affected by factors such as the positions of inflection points, geometry (e.g., size, width), depth, roughness, number of the grooves, etc.

BRIEF SUMMARY OF THE INVENTION

Problems to be Solved

An object of the present invention is to provide a shaft sealing device, wherein gas is introduced and pressurized by a groove, a gas flow enters the groove from an opening end of the groove at a proper incident angle for increasing an amount of the gas introduced into the groove, and at the same time, the compression ratio and efficiency of the introduced gas are controlled by the geometry of the groove for enhancing sealing performance of the shaft sealing device.

Technical Means for Solving Problems

The present invention is completed in order to solve the above problems, and can be implemented in the following embodiments.

According to one embodiment of the present invention, a shaft sealing device is provided for being mounted on a rotating shaft. The shaft device includes a stationary member disposed on a housing of the shaft sealing device and having a first sealing surface; a rotary member corresponding to the stationary member, disposed on the rotating shaft and having a second sealing surface opposite to the first sealing surface of the stationary member, and a groove disposed on the first sealing surface or the second sealing surface and extending inwardly from an outer peripheral edge, wherein an end of the groove extends along a tangential direction of an imaginary circle C1 containing a bottom wall of the groove.

In the shaft sealing device of the embodiment, a distance between the end (bottom wall) of the groove and a center of circle of the first sealing surface is substantially between $R_I + 0.2(R_O - R_I)$ and $R_I + 0.5(R_O - R_I)$.

Figure 3:
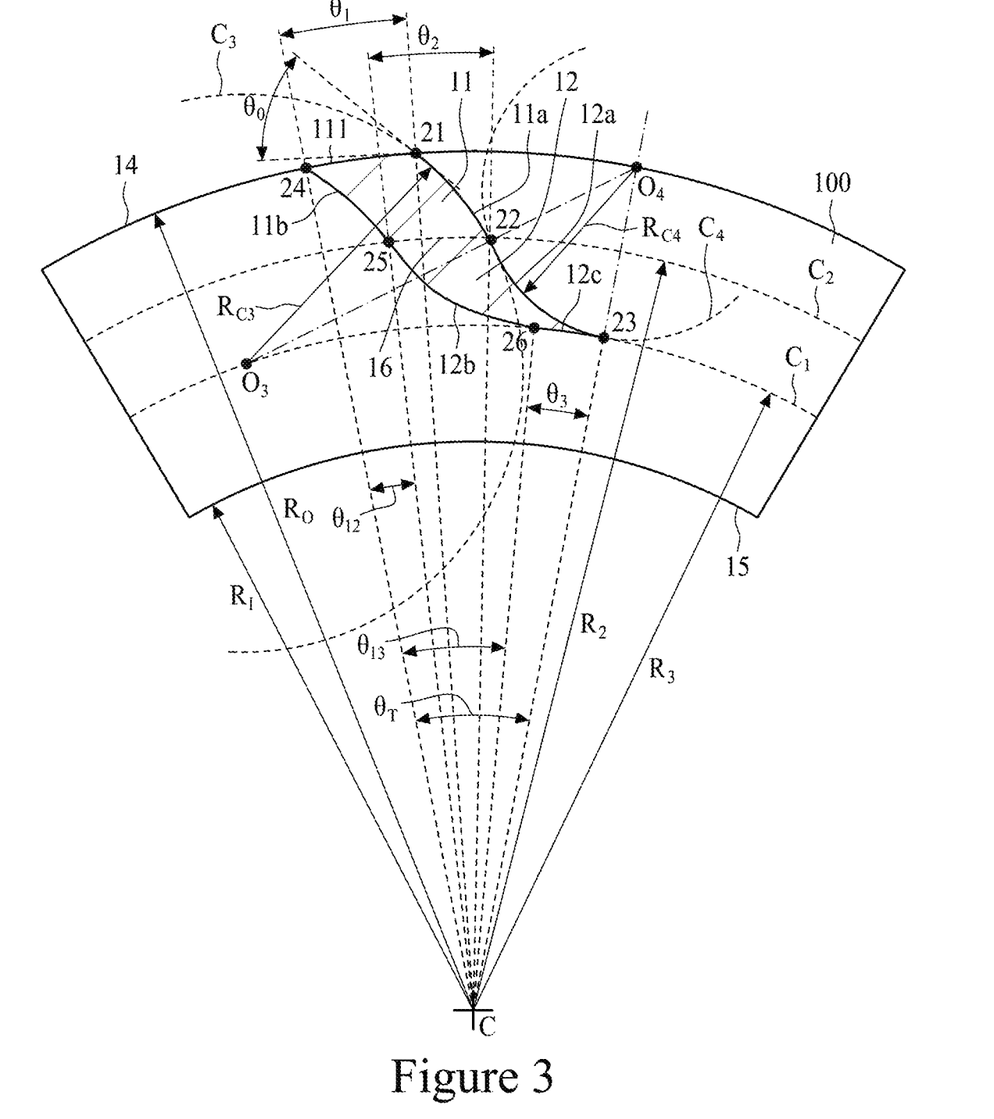
FIG. 3 is an enlarged view showing a portion 10a of the groove in FIG. 2.

In the shaft sealing device of the embodiment, the groove further includes a first region and a second region, the first region includes a first left sidewall and a first right sidewall (in the direction from an inner edge of the sealing surface toward an outer edge, a left hand side is the left side as 11b and 12b shown in FIG. 3, and a right hand side is the right side as 11a and 12a shown in FIG. 3), the second region includes a second left sidewall and a second right sidewall, and the first left sidewall and the first right sidewall are connected to the second left sidewall and the second right sidewall, respectively.

Figure 5A:
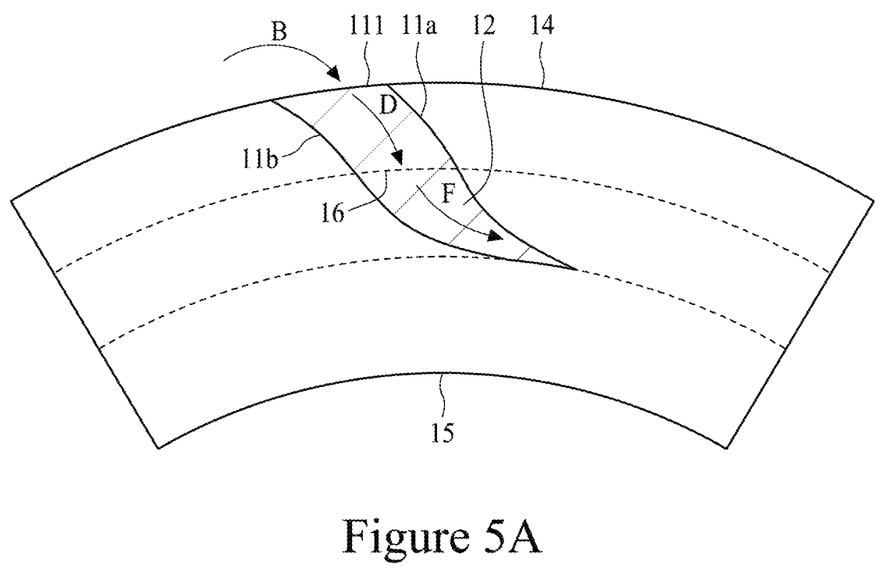
FIG. 5A is a schematic view showing a groove of a sealing surface according to the present invention.
Figure 5B:
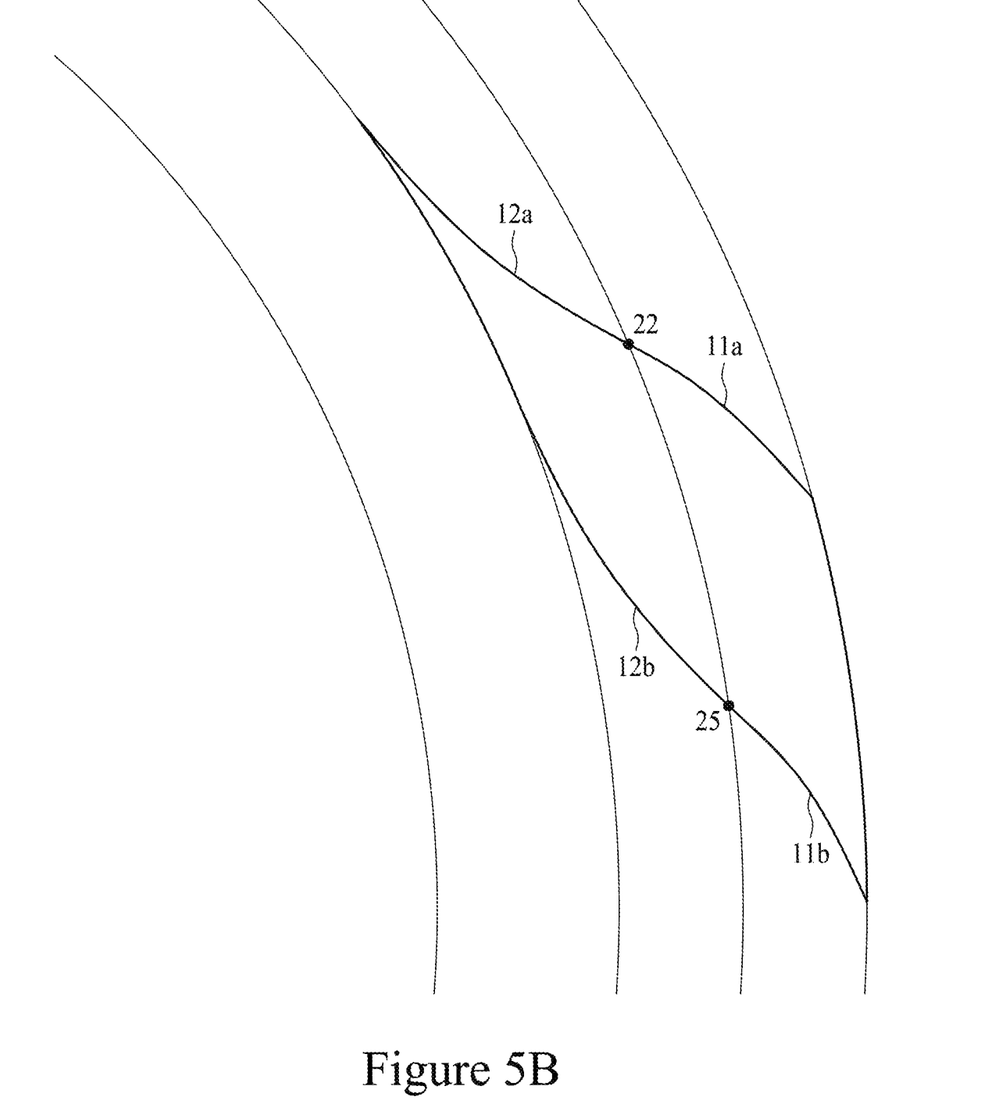
FIGS. 5B to 5E are schematic views showing grooves according to embodiments of the present invention.
Figure 5C:
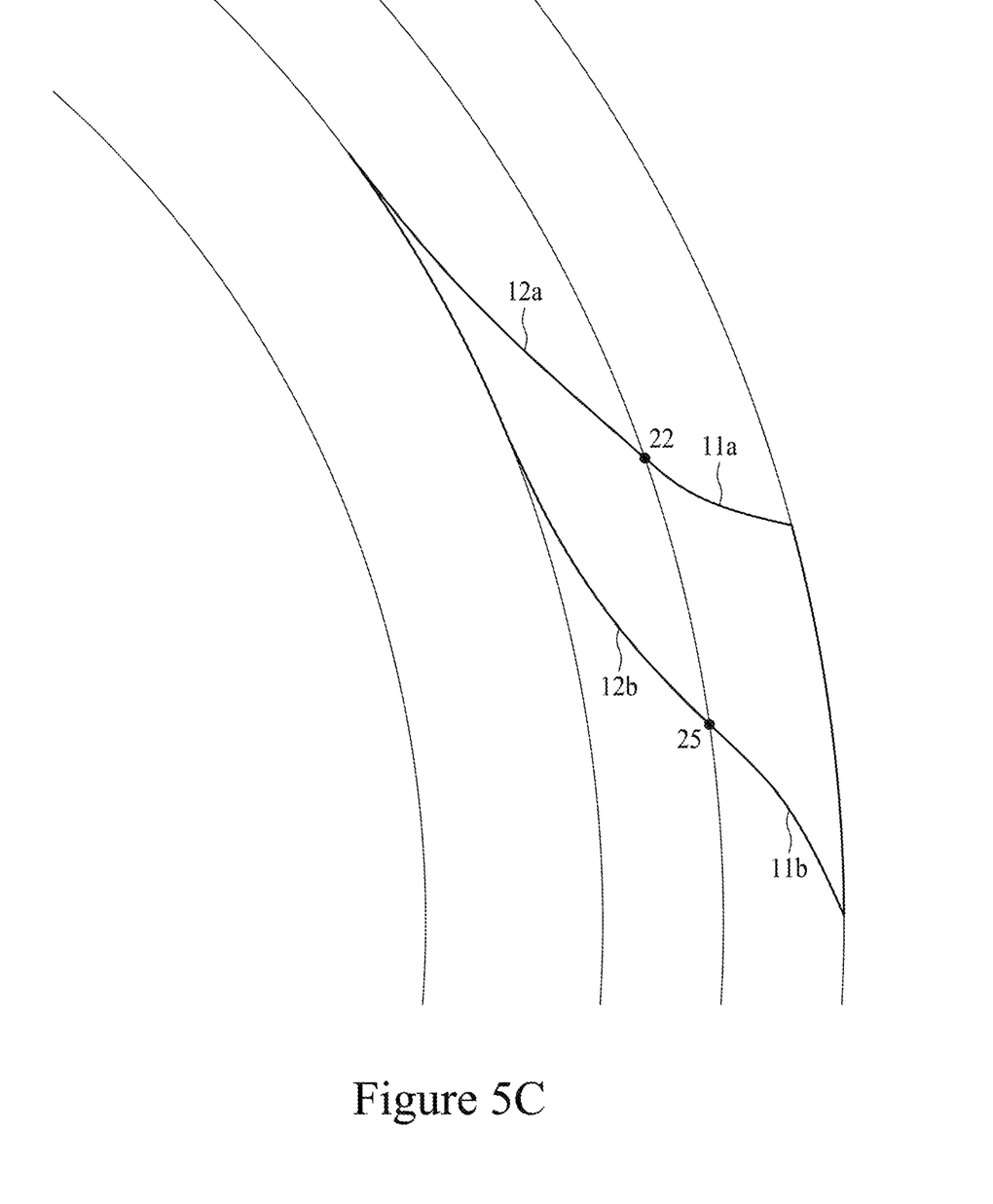
Figure 5D:
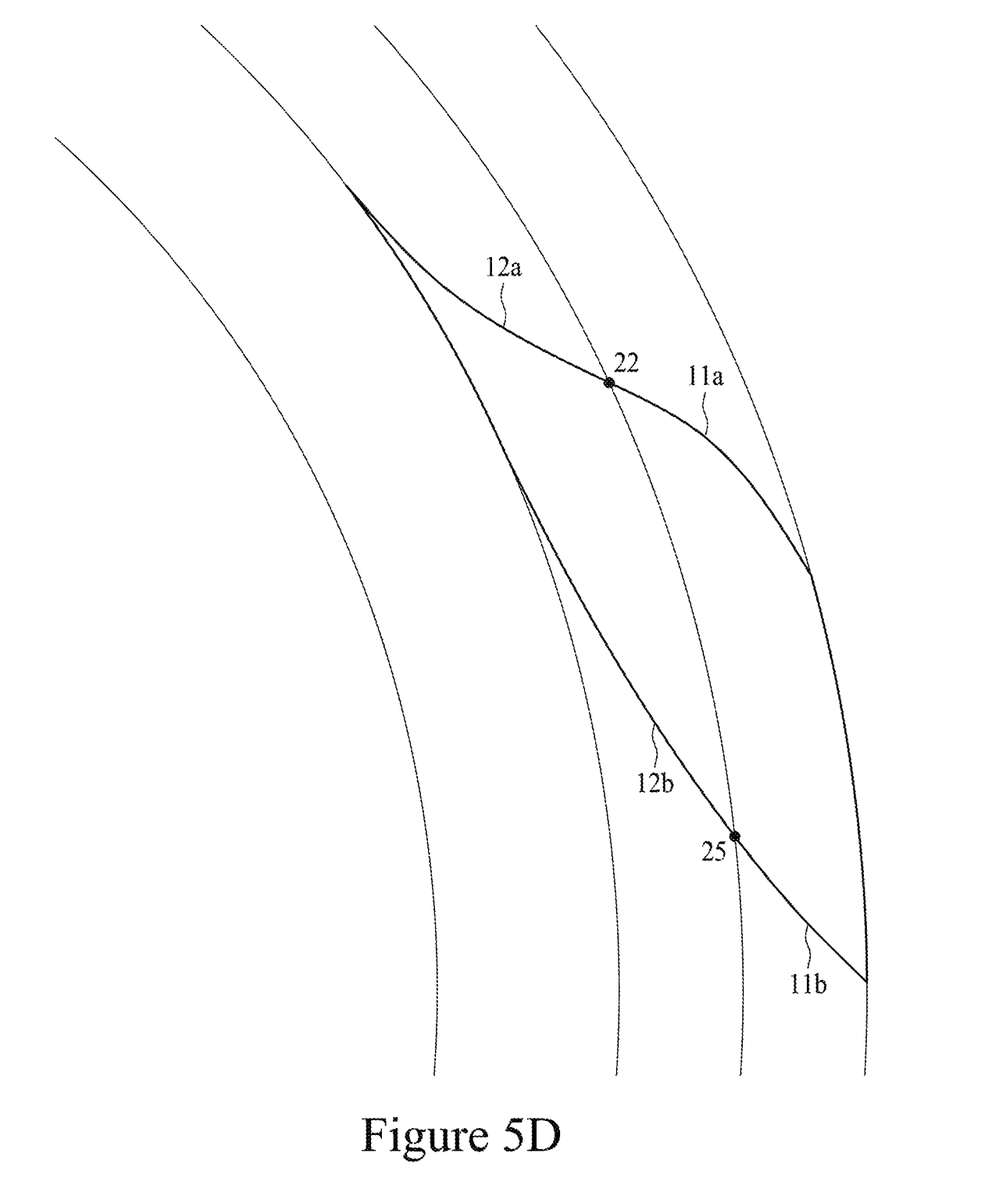
Figure 5E:
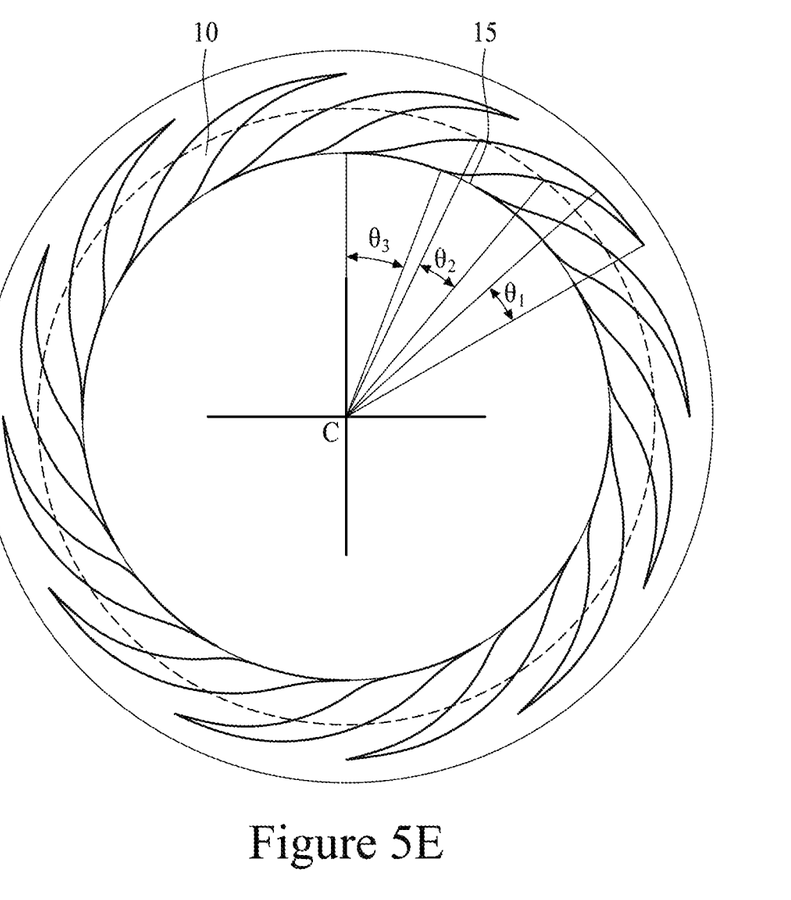

In the shaft sealing device of the embodiment, referring to FIG. 5(B), if $\theta_3 = \theta_2 = \theta_1$, the first right sidewall and the second right sidewall are respectively formed by rotating the first left sidewall and the second left sidewall by an angle with respect to a center of the circle of the first sealing surface or the second sealing surface. Referring to FIGS. 5(C) to 5(E), if $\theta_3$, $\theta_2$ and $\theta_1$ are not exactly the same, the left and right sidewalls are different in shape.

In the shaft sealing device of the present embodiment, in the case of $\theta_3 = \theta_2 = \theta_1$, the above mentioned rotation angle is $\theta_1$, and in the case that the groove and a ridge (a region between two adjacent grooves) have the same shape, then $\theta_1 = 360°/(2*NB)$, wherein NB is the number of grooves. In addition, the rotation angles of an inflection point and the bottom wall of the groove are $\theta_{12}$ and $\theta_{13}$, respectively, wherein $\theta_{13} > \theta_{12}$ and $\theta_1 = \theta_3 + \theta_{13}$ is usually more than twice $\theta_1$.

In the shaft sealing device of the embodiment, the groove has a bottom wall, and the bottom wall has the same center of curvature as inner and outer peripheral edges of the first sealing surface or the second sealing surface.

In the shaft sealing device of the embodiment, the groove has a depth being substantially 4 μm~15 μm corresponding to the range from 0.004 mm to 0.015 mm.

In the shaft sealing device of the embodiment, there are a plurality of grooves arranged in a circle along the outer peripheral edge or the inner peripheral edge of the first sealing surface or the second sealing surface.

This groove is characterized in that each sidewall is formed as a curve with an inflection point, and each groove is created with an appropriate depth distribution to achieve the purpose of enhancing the sealing performance. In comparison with the conventional grooves, this groove is characterized in that (1) by selecting the positions and width of the inflection points, the amount of the introduced gas, the initial compression region and the degree of compression are controlled; and (2) the energy loss resulted from the vortices and turbulence generated as the gas flow passes through the groove is reduced, compression efficiency is enhanced, and stability and reliability of sealing are improved by the geometrical properties of this inflection-point groove, thereby enhancing the sealing performance of the shaft sealing device.

Effects of the Present Invention

The shaft sealing device of the present invention has the following advantages and beneficial effects: according to the present invention, the amount of the gas introduced to the groove can be controlled, and the compression level and efficiency of the introduced gas are adjusted by the geometrical properties of the groove, thereby enhancing sealing performance of the shaft sealing device.

DETAILED DESCRIPTION

In the following descriptions, an embodiment of a shaft sealing device of the present invention will be described in detail with reference to the accompanying drawings.

Figure 1:
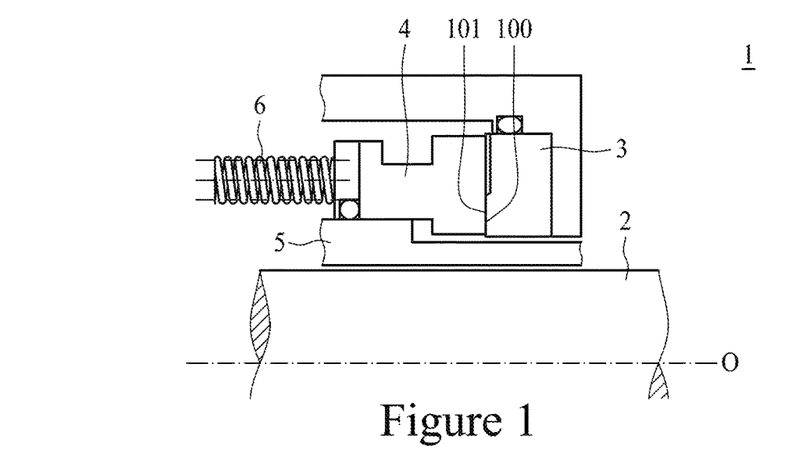
FIG. 1 is a schematic view showing a shaft sealing device according to the present invention.

FIG. 1 shows a shaft sealing device 1 of the present invention, which can be mounted on rotating equipment such as a pump, a compressor, a mixer, etc. for providing shaft sealing. The shaft sealing device 1 of the present invention includes a rotating shaft 2, a stationary member (a stationary ring) 3 and a rotary member (a rotary ring) 4. In the present embodiment, the stationary member 3 is disposed on a housing of the shaft sealing device 1 and has a first sealing surface 100, and the stationary member 3 can be disposed so as to be surrounded by the housing of the shaft sealing device 1. The rotary member 4 is disposed on the rotating shaft 2, as shown in FIG. 1. The rotary member 4 can be disposed so as to surround the outer edge of the rotating shaft 2, and in the present embodiment, the rotary member 4 is disposed so as to surround an axis of the rotating shaft 2 in the direction of O. Further, the rotary member 4 has a second sealing surface 101 opposite to the first sealing surface 100 of the stationary member 3, and the shaft sealing device 1 provides a sealing function for the rotating equipment through the sealing gap between and confined by the first sealing surface 100 and the second sealing surface 101.

A sleeve 5 can be selectively disposed on the rotating shaft 2 as shown in the present embodiment, and the sleeve 5 can surround the outer edge of the rotating shaft 2. In one embodiment, a plurality of positioning members such as O-rings can be further disposed on the shaft sealing device 1 to position or seal the stationary member 3, the rotary member 4, the sleeve 5 and the like. In particular, an O-ring is also known as a secondary sealing element. In one embodiment, a gland is further disposed to match the stationary membrane 3. In one embodiment, the gland and the stationary component 3 can be coupled by an elastic member 6 such as a spring member.

Figure 2:
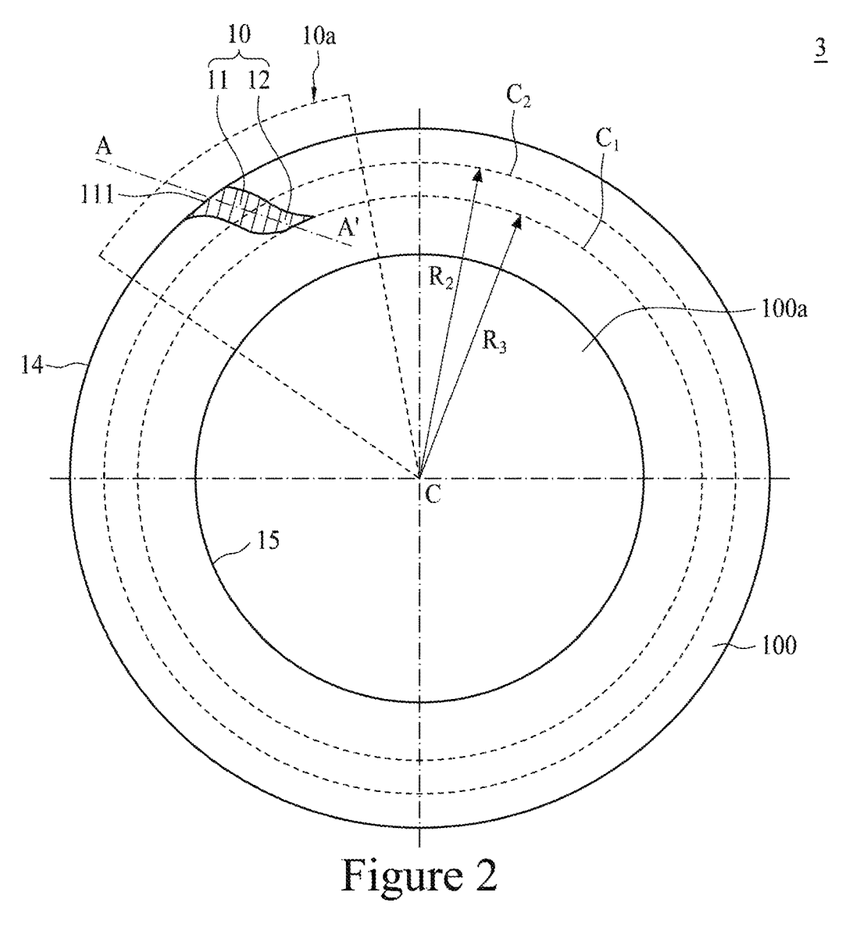
FIG. 2 is a schematic view showing a groove of a sealing surface according to the present invention.

In the shaft sealing device 1 of the present invention, a groove 10 is disposed on the first sealing surface 100 of the stationary member 3 or on the second sealing surface 101 of the rotary member 4. In one embodiment, the groove 10 is disposed on the first sealing surface 100 of the stationary surface 3, but is not limited thereto. FIG. 2 is a schematic view showing the groove 10 on the first sealing surface 100 of the stationary member 3. FIG. 3 is an enlarged view showing a portion 10a of the groove in FIG. 2. Referring to FIG. 2 and FIG. 3, the groove 10 of the present disclosure is further illustrated. In the present invention, the first sealing surface 100 is an annular ring with a through hole 100a for the rotating shaft 2 to pass through. The first sealing surface 100 has an outer peripheral edge 14 and an inner peripheral edge 15, both edges sharing the same center, point C. The shape of the groove 10 is indicated by the selected area. In one embodiment, the groove 10 is formed on the first sealing surface 100, and the groove 10 extends inwardly from the outer peripheral edge 14 of the first sealing surface 100. In one embodiment, the groove 10 extends outwardly from the inner peripheral edge 15, such as an upstream pumping groove. In one embodiment, the way groove 10 extends can be determined according to the design requirements. As shown in FIG. 2, the groove 10 extends inwardly in a curved manner with curvatures (that is, each sidewall of the groove 10 is a curve with an inflection point), and the curvature of the curve is designed to match the rotation parameters of the rotating shaft 2 or the rotating member 4 such as a rotation speed, a rotation direction, etc. determined optionally by the designer.

As shown in FIG. 2, the groove 10 can extend inwardly but not extend to the inner peripheral edge 15. In some embodiments, the groove 10 can extend inwardly from the outer peripheral edge 14, and can also extend outwardly from the inner peripheral edge 15. In one embodiment, the groove 10 has two sidewalls, which can both extend in a curved way, or one of which can extend in a linear way. In some embodiments, the extension starting point, the extension endpoint, the extension way, etc. of the groove 10 may be optionally determined by the designer according to the application of the shaft sealing device 1.

The groove 10 includes a first region (an outer region of the groove) 11 and a second region (an inner region of the groove) 12, and the two regions are defined by a boundary line 16 between point 22 and point 25. The boundary line 16 is a part of an imaginary circle C2 (the definition of the imaginary circle C2 will be described in detail later). In one embodiment, the first region 11 of the groove 10 further includes a sidewall 11a and a sidewall 11b opposite to the sidewall 11a. The sidewalls 11a, 11b are a right sidewall and a left sidewall of the outer region of the groove, respectively. The second region 12 further includes a sidewall 12a, a sidewall 12b and a bottom wall 12c. The sidewalls 12a, 12b are a right sidewall and a left sidewall of the inner region of the groove, respectively. The bottom wall 12c is a bottom wall of the groove. In one embodiment, as shown in FIG. 3, the first region 11 is defined by an opening 111, the sidewall 11a, the sidewall 11b, and the boundary line 16 of the first region 11 and the second region 12. The second region 12 is defined by the boundary line 16, the sidewall 12a, the sidewall 12b and the bottom wall 12c. The boundary line 16 is an arc connecting the first region 11 and the second region 12.

As shown in FIG. 2, the first region 11 extends toward the inner peripheral edge 15 from the opening 111 disposed on the outer peripheral edge. The second region 12 extends beyond the first region 11, and to a position that is a distance of radius $R_3$ from point C. As shown in FIG. 2, the imaginary circle $C_1$ is centered at point C with a radius of $R_3$. The imaginary circle $C_2$ is centered at point C with a radius of $R_2$. The imaginary circles $C_1$ and $C_2$ pass through the bottom wall of the groove and inflection points, respectively. The distance from point C to the outer peripheral edge 14 on the first sealing surface 100 is defined as an outer radius $R_O$ of the first sealing surface 100, and the distance from point C to the inner peripheral edge 15 on the first sealing surface 100 is defined as an inner radius $R_I$ of the first sealing surface 100.

In one embodiment, the bottom wall 12c can be a part of the imaginary circle $C_1$. When the groove extends from the outside to the inside, the end (bottom wall) of the groove extends along the tangential direction of the imaginary circle $C_1$ containing the bottom wall of the groove. In one embodiment, the range of the radius $R_3$ is generally between $R_I+0.2(R_O-R_I)$ and $R_I+0.5(R_O-R_I)$. In one embodiment, the first region 11 and the second region 12 are delimited by an arc that is a distance of radius $R_2$ from point C. The radius $R_2$ ranges from $R_3$ to $R_O$ (i.e. $R_3<R_2<R_O$). In one embodiment, $R_2$ approaches $R_3$ to form a spiral-like groove with inflection points close to the bottom wall of the groove, and their relationship is substantially $R_2=R_3+0.045(R_O-R_3)$. In one embodiment, the first region 11 and the second region 12 extend in a curved way. In one embodiment, the sidewall 11a, the sidewall 11b, the sidewall 12a and the sidewall 12b of the first region 11 and the second region 12 are curves with specific radii of curvature.

In one embodiment, the imaginary circle $C_4$ forming the sidewall 12a of the second region 12 is externally tangent to the imaginary circle C, at point 23. In one embodiment, the radii of curvature of sidewalls 11a and 12a can be determined according to the rotation parameters of the rotating shaft 2 or the rotary member 4, such as rotational speed, rotational direction, etc.

In the present disclosure, definitions of an upward concave curve and a downward concave curve are as follows. If the center of curvature of the curve and point C are located on the opposite sides of the curve (i.e., the two circles are externally tangent), the curve is defined as an upward concave curve. If the center of curvature of the curve and point C are located on the same side of the curve (i.e., the two circles are internally tangent), the curve is defined as a downward concave curve. In one embodiment, the sidewalls 11a and 11b of the first region 11 form a downward concave curve. In one embodiment, the sidewalls 12a and 12b of the second region 12 form an upward concave curve. The junction of the sidewall 11a and the sidewall 12a is an inflection point. Similarly, the junction of the sidewall 11b and the sidewall 12b is also an inflection point. In one embodiment, the formation and the position of the inflection point can be adjusted according to user's needs.

In one embodiment, the sidewall 11a and the sidewall 12a are delimited by intersection 22. The intersection 22 is an end point of the boundary line 16, which partially overlaps the circumference of the imaginary circle $C_2$. In one embodiment, the sidewall 12a extends toward the inner peripheral edge 15, and intersects the imaginary circle $C_1$ at point 23. In one embodiment, the intersection 23 is the tangent point of the sidewall 12a and the imaginary circle $C_1$. In one embodiment, the imaginary circle $C_2$ is located at the radial center between the imaginary circle $C_1$ and the outer peripheral edge 14. In one embodiment, the intersection 22 of the sidewall 11a and the sidewall 12a is on the circumference of the imaginary circle $C_2$. In one embodiment, the intersection 22 is not on the circumference of the imaginary circle $C_2$, and shifts to the outer peripheral edge 14 or the bottom wall 12c, such that the sidewalls 11a and 12a are different in length in the radial direction. In one embodiment, the intersection 22 is on the outer peripheral edge 14 or the bottom wall 12c, such that the sidewall 11a or the sidewall 12a degrades to a point.

Similar to the embodiment of the intersection 22 described above, in an embodiment, the intersection 25 of the sidewall 11b and the sidewall 12b is formed on the circumference of the imaginary circle $C_2$. In one embodiment, the intersection 25 is not formed on the circumference of the imaginary circle $C_2$, and shifts to the outer peripheral edge 14 or bottom wall 12c, such that sidewall 11b and sidewall 12b are different in length in the radial direction. In one embodiment, the intersection 25 is formed on the outer peripheral edge 14 or the bottom wall 12c, such that the sidewall 11b or the sidewall 12b degrades to a point. More specifically, in one embodiment, the intersection 22 and the intersection 25 are on the circumference of the same imaginary circle $C_2$, or shift to the outer peripheral edge 14 or the bottom wall 12c, respectively.

In one embodiment, the sidewall 11a intersects the outer peripheral edge 14 at intersection 21. In one embodiment, the sidewall 11a and a tangent of the outer peripheral edge 14 at the intersection 21 form an angle $\theta_0$, which is the angle of incidence of the introduced gas flow into the groove. The range of the angle $\theta_0$ is between 0° and 90°. In one embodiment, the range of the angle $\theta_0$ is substantially from 10 to 45 degrees. In one embodiment, the range of the angle $\theta_0$ is substantially from 30 to 40 degrees. In one embodiment, the flow rate and flow field quality of the introduced gas are controlled by adjusting the angle $\theta_0$. In one embodiment, the incident angle $\theta_0$ of the introduced gas is inversely proportional to the tangential or surface speed of the gas flow around the outer edge of the sealing ring, and is proportional to the pressure differential of the introduced gas. In one embodiment, the angle $\theta_0$ can be optionally determined by the designer according to the operating conditions of the shaft sealing device such as rotational speed, rotational direction, rotational radius, viscosity and density. (Please note that when optimizing $\theta_0$, the Reynolds number of the gas flow must be considered.) In terms of the geometry of the groove, the angle $\theta_0$ in FIG. 3 is calculated as follows:

$$\theta_0 = \cos^{-1}\left(\frac{R_{C3}^2 + R_O^2 - \overline{CO_3}^2}{2R_{C3}R_O}\right)$$

In one embodiment, the sidewall 11b intersects the outer peripheral edge 14 and the imaginary circle $C_2$ at intersection 24 and intersection 25, respectively. In one embodiment, the sidewall 12b intersects the imaginary circle $C_2$ and the imaginary circle $C_1$ at intersection 25 and intersection 26, respectively. In one embodiment, the curve comprising sidewalls 11b and 12b with intersections 24, 25, and 26 has the same shape as the curve comprising sidewalls 11a and 12a with intersections 21, 22, and 23. In one embodiment, an angle $\theta_1$ is the angular displacement from point 24 to point 21 on circle C with a radius of $R_O$. The angle $\theta_1$ is an outer curvature of the groove. In the case that the shapes of the groove and the ridge (the region between two adjacent grooves) are identical, angle $\theta_1=360°/(2*NB)$, wherein NB is the total number of grooves. In one embodiment, the angle $\theta_2$ is the angular displacement from point 25 to point 22 on circle $C_2$. The angle $\theta_2$ is a curvature of the inflection points of the groove. The range of the angle $\theta_2$ is $\theta_3 \le \theta_2 \le \theta_1$. In one embodiment, the angle $\theta_T$ is the angular displacement from point 26 to point 23 on circle $C_1$. The angle $\theta_3$ is the angular distance of the bottom wall 12c of the groove. The range of the angle $\theta_3$ is $0 \le \theta_3 \le \theta_2$. In one embodiment, the angle $\theta_T$ is the angular displacement from point 24 to point 23 with respect to point C. The angle $\theta_T$ is the total angular distance of the groove ($\theta_T=\theta_3+\theta_{13}$), and angle $\theta_T$ ranges substantially from $2\theta_1$ to $5\theta_1$.

In one embodiment, the angles $\theta_1$, $\theta_2$ and $\theta_3$ all have the same angle. In one embodiment, at least two of the angles $\theta_1$, $\theta_2$ and $\theta_3$ are different. In one embodiment, the angle $\theta_1$ is substantially greater than or equal to the angle $\theta_2$. In one embodiment, the angle $\theta_2$ is substantially greater than or equal to the angle $\theta_3$. In one embodiment, at least two of the sectors formed by the angles $\theta_1$, $\theta_2$ and $\theta_3$ overlap each other. In one embodiment, the sectors formed by the angles $\theta_1$, $\theta_2$ and $\theta_3$ do not overlap each other. In one embodiment, the relationship between angles $\theta_1$ and $\theta_2$ is $\theta_2 \le \theta_1$. In one embodiment, the relationship between angles $\theta_2$ and $\theta_3$ is $\theta_3 \le \theta_2$.

The above discussion about the angles $\theta_1$, $\theta_2$ and $\theta_3$ is applicable to the case where the groove extends from the outer edge of the sealing surface to the inner edge. If the groove extends from the inner edge to the outer edge as shown in FIG. 5(E), the angular relationship is generally $0 \le \theta_1 < \theta_2 < \theta_3$. In one embodiment, the angle $\theta_{12}$ is the angular displacement from point 24 to point 25 with respect to point C. In one embodiment, the angle $\theta_{13}$ is the angular displacement from point 24 to point 26 with respect to point C. The angles $\theta_{12}$ and $\theta_{13}$ are the angular displacement of the inflection point 25 and the angular displacement of the bottom wall, respectively. In one embodiment, the range of the angle $\theta_{12}$ is substantially $0 < \theta_{12} \le \theta_1$. In one embodiment, the range of the angle $\theta_{13}$ is substantially $\theta_{13} > \theta_{12} + \theta_2$. In one embodiment, the angle $\theta_T$ is indicated as $\theta_T = \theta_{13} + \theta_3$.

In one embodiment, sidewall 11a is a part of the imaginary circle $C_3$ centered at $O_3$ with a radius of $R_{C3}$. In one embodiment, sidewall 12a is a part of the imaginary circle $C_4$ centered at $O_4$ with a radius of $R_{C4}$. In one embodiment, the radius of curvature $R_{C4}$ is mainly determined by $R_2$, $R_3$, $\theta_{12}$ and $\theta_{13}$. Once the position of $O_4$ is determined, the range of $R_{C3}$ is mainly determined by $R_O$ and $\theta_{12}$. In one embodiment, the center $O_4$ is located on an extension line passing through point C and point 23. In one embodiment, the imaginary circles $C_1$ and $C_4$ are tangent to each other at point 23. In one embodiment, the imaginary circles $C_3$ and $C_4$ are tangent to each other at point 22. In one embodiment, the center $O_3$ of circle is located on an extension line passing through the center $O_4$ and point 22. In one embodiment, the center $O_3$, the center $O_4$ and point 22 are located on the same line. In one embodiment, the imaginary circle $C_2$, the imaginary circle $C_3$ and the imaginary circle $C_4$ intersect at point 22.

In one embodiment, the bottom wall 12c forms a part of the circumference of the imaginary circle $C_1$. In one embodiment, a ratio $R_a$ of the difference between the outer radius $R_O$ and the radius $R_2$ to the difference between the radius $R_2$ and the radius $R_3$ is substantially from 0.2 to 25. In one embodiment, the range of the ratio $R_a$ is substantially from 0.28 to 3.35. In one embodiment, a ratio $R_b$ of the difference between the outer diameter $R_O$ and the radius $R_3$ to the difference between the radius $R_3$ and the inner radius $R_4$ is substantially from 1.0 to 2.0. In one embodiment, the range of the ratio $R_b$ is substantially 1.095 to 1.726.

Figure 4A:
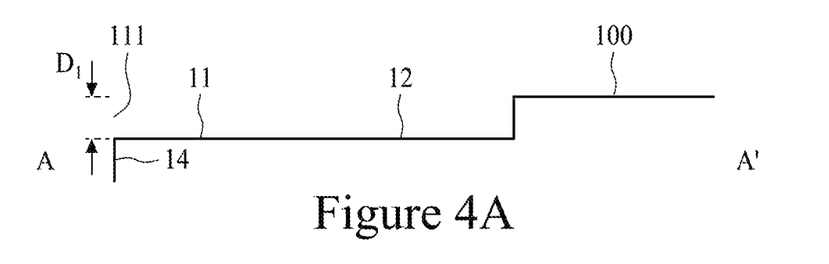
FIGS. 4A to 4C are cross-sectional views along the dashed line AA' in FIG. 2.

FIG. 4A is a cross-sectional view taken along the line AA' of FIG. 2. In the present embodiment, a groove with a specific depth is formed from the opening 111 of the region 11. The groove extends inwardly from the opening 111, and as shown in FIG. 2, but does not extend to the inner peripheral edge 15. In one embodiment, the depth of the first region 11 and the second region 12 keeps constant from the outer peripheral edge 14 to inside. In one embodiment, the maximal depth $D_1$ of the first region 11 and the second region 12 can be substantially in a range from 0.001 to 0.5 mm, corresponding to 1 μm~500 μm (1 μm=$10^{-3}$ mm). When the depth is in the range from 0.001 to 0.5 mm, sufficient gas flow can be provided, resulting in less gas consumption. In one embodiment, the maximal depth $D_1$ of the first region 11 and the second region 12 can be set substantially in a range from 0.008 to 0.010 mm.

Figure 4B:
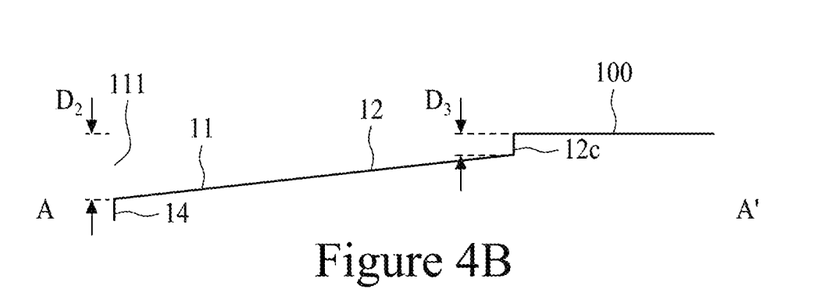

FIG. 4B is a schematic view showing an embodiment of the cross-sectional view taken along the line AA'. In the embodiment, as shown in FIG. 4B, the first region 11 and the second region 12 can be formed on the first sealing surface 100 from the outer peripheral edge 14 all the way to the inside in a tapered manner. In one embodiment, the maximal depth $D_2$ of the first region 11 and the second region 12 is in a range from 0.013 to 0.015 mm. In one embodiment, the bottom wall 12c of the second region 12 can be formed as an end surface with a depth of $D_3$. In one embodiment, depth D3 can be in a range from 0 to 0.002 mm. In one embodiment, the bottom wall 12c of the second region 12 can be in contact with the first sealing surface 100 without forming an end surface having a height difference. In case of more right-angle steps, chances are more vortices and turbulence will develop during operation, leading to lower compression efficiency and extra heat. Conclusively, a groove with a smooth depth gradient as the tapered one shown in FIG. 4B can achieve a better compression effect.

Figure 4C:
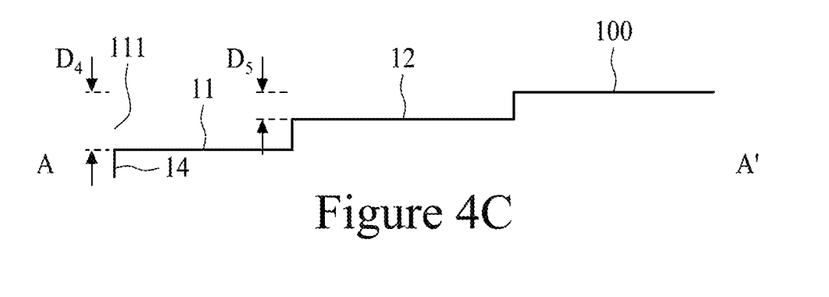

In one embodiment, as shown in FIG. 4C, the first region 11 and the second region 12 can be formed on the first sealing surface 100 from the outer peripheral edge 14 to inside in a step-like manner. In one embodiment, the first region 11 and the second region 12 can have the depth $D_4$ and the depth $D_5$, respectively, where $D_4$ and $D_5$ are different and both measured from surface 100. In one embodiment, the depth $D_4$ can be in a range from 0.013 to 0.015 mm. In one embodiment, the depth $D_5$ can be in a range from 0.004 to 0.006 mm. In one embodiment, the ratio of the depth $D_4$ to the depth $D_5$ can be in a range from 2.0 to 4.0.

FIG. 5A is a schematic view showing a gas flow passing through the groove 10. During the introduction of external gas into the groove 10, as shown in FIG. 5A, there are gas flow B, gas flow D and gas flow F, wherein the gas flows B, D and F represent the directions in which the external gas is introduced into the groove. In one embodiment, the gas flow B is the gas flow in which the external gas is being introduced into the groove 10. The gas flow B is distributed on the outer peripheral edge 14 of the first sealing surface 100, and introduced into the groove 10 from the opening 111 across the outer peripheral edge 14. The gas flow B flows into the first region 11 of the groove 10 to form the gas flow D. T gas flow D is introduced toward the inner peripheral edge 15 along the sidewall 11a and the sidewall 11b of the first region 11. After passing through the boundary line 16 between the first region 11 and the second region 12, the gas flow D forms the gas flow F. The gas flow F is introduced toward the inner peripheral edge 15 along the sidewall 12a and the sidewall 12b of the second region 12. When the gas flow F is introduced to be close the bottom wall 12c, the gas flow F is introduced along the tangential direction of the imaginary circle $C_1$ and extends toward the inner edge of the sealing surface.

In comparison with the conventional groove such as a spiral groove, the inflection-point groove in the present invention has been experimentally proven to have better effects on gas compression and gas film stiffness, and moreover, since the shape of the groove has wider variations, there is more flexibility in both design and application.

In one embodiment, one sidewall of the groove 10 degrades to a curve without any inflection point. That is, the groove 10 can have inflection point on each of the two sidewalls (the intersection 22 and the intersection 25 are both inflection points), or can have only one inflection point on one of the sidewalls (one of the intersection 22 and the intersection 25 is an inflection point). FIG. 5B to FIG. 5D show the embodiments of the groove 10. In one embodiment, as shown in FIG. 5B, the point 22 between the sidewall 11a and the sidewall 12a forms an inflection point, and the point 25 between the sidewall 11b and the sidewall 12b also forms an inflection point. In one embodiment, as shown in FIG. 5C, the sidewall 11a and the sidewall 12a both degrade to a curve without any inflection point, and point 25 between the sidewall 11b and the sidewall 12b still forms an inflection point. In one embodiment, as shown in FIG. 5D, point 22 between the sidewall 11a and the sidewall 12a forms an inflection point, and the sidewall 11b and the sidewall 12b both degrade to a curve without any inflection point.

Figure 6:
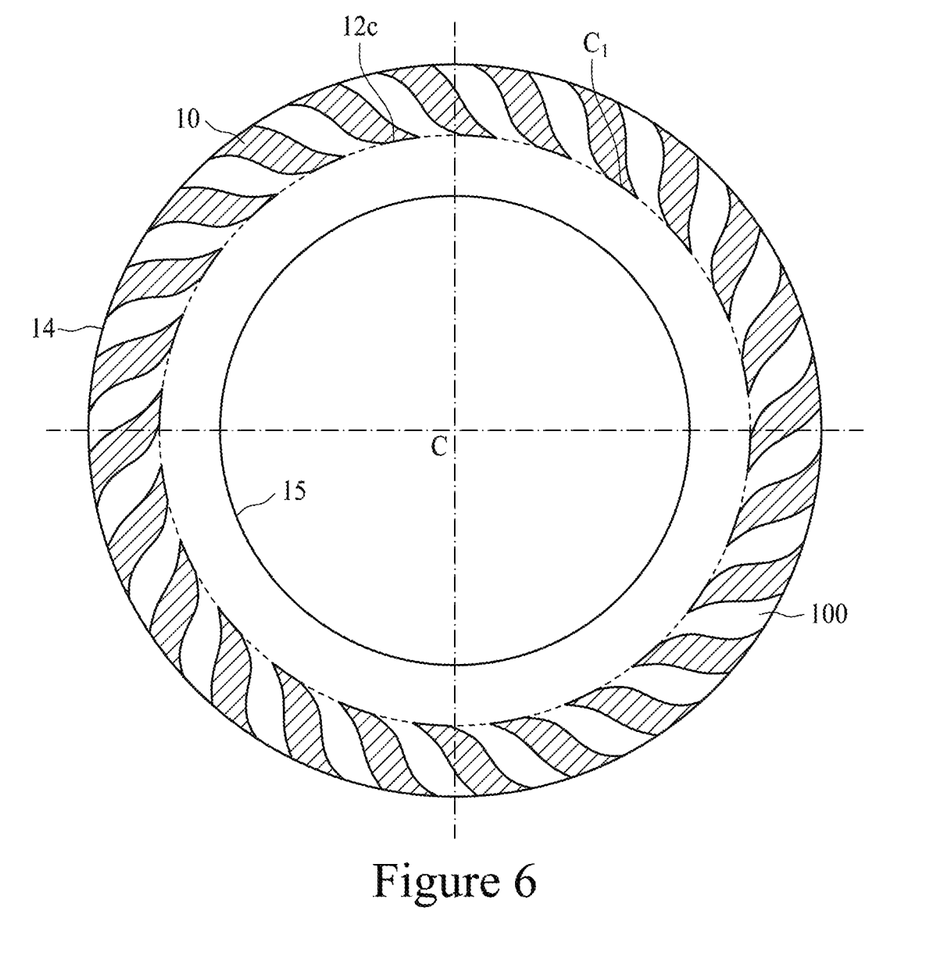
FIG. 6 is a schematic view showing a groove according to an embodiment of the present invention.

FIG. 6 shows an embodiment of the groove 10 of the first sealing surface 100 in the present invention. In the present embodiment, there are some grooves 10. The grooves 10 are arranged in a circle along the outer peripheral edge 14 with point C as the center. In one embodiment, as shown in FIG. 5E, the grooves 10 are arranged in a circle along the inner peripheral edge 15. In one embodiment, as shown in FIG. 6, the bottom walls 12c of the grooves 10 overlap the imaginary circle $C_1$. In one embodiment, there are grooves 10 on the first sealing surface 100, and the number of the grooves 10 is NB. In one embodiment, the range of NB is substantially from 8 to 30. In one embodiment, the range of NB is substantially from 12 to 24. In one embodiment, the range of NB is substantially from 16 to 20. In one embodiment, the grooves 10 have the same profile. In one embodiment, the ridges have the same shape as the grooves 10, wherein each ridge is formed between each two adjacent grooves 10. And, the relationship between angle $\theta_1$ and the number of the grooves, NB, is $\theta_1=360°/(2*NB)$.

In the following descriptions, the implementation of the present invention is illustrated in detail with reference to FIGS. 7A-7B and FIGS. 8A-8B.

Figure 7A:
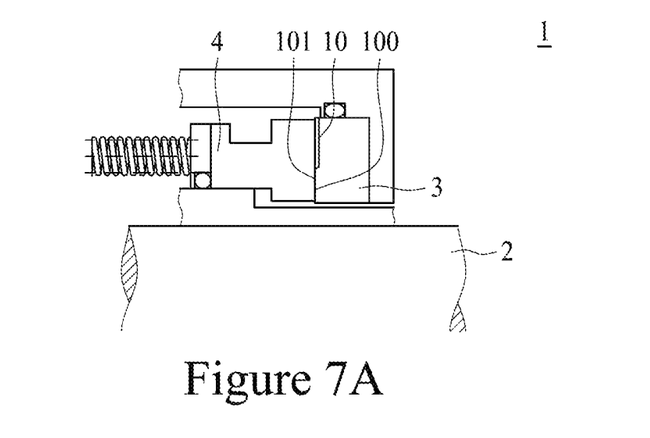
FIGS. 7A to 7B are schematic views showing a shaft sealing device having a groove of the present invention according to an embodiment of the present invention.
Figure 7B:
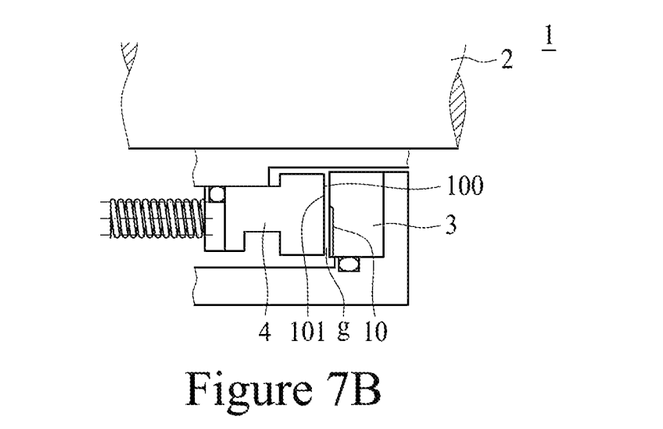

FIG. 7A shows the shaft sealing device 1 in the stationary state, and FIG. 7B shows the shaft sealing device 1 in the operating state. In the present embodiment, the groove 10 is formed on the first sealing surface 100 of the stationary member 3. When the rotating shaft is stationary, the sealing film is resulted from the gas pressure differential between the inner side and the outer side of the first sealing surfaces 100, 101 to separate the faces. When the shaft rotates, groove 10 corresponds to the impeller of a pump, and the gas introduced into groove 10 is subjected to dynamic compression to increase both dynamic and static pressures. An excellent groove not only has better compression effects, but also has higher sealing film stiffness (sealing film stiffness) to provide a thicker film for resisting unfavorable operating parameters such as vibration.

In the present embodiment, as the rotating shaft 2 and the rotary member 4 are in motion, the external gas is introduced between the first sealing surface 100 and the second sealing surface 101 along the groove 10 of the stationary member 3, and a sealing gap g is formed between the first sealing surface 100 and the second sealing surface 101 by the dynamic pressure and static pressure of the introduced gas. As shown in FIG. 7B, the gas inside the shaft sealing device 1 is forced to flow through the gap g by the pressure differential between the inside and the outside of the shaft sealing device 1, so as to form a fluid sealing surface to achieve the sealing effect.

Figure 8A:
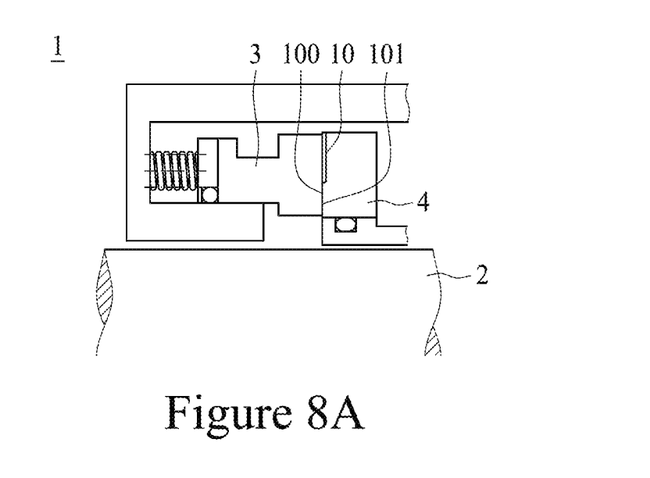
FIGS. 8A to 8B are schematic views showing a shaft sealing device having a groove of the present invention according to an embodiment of the present invention.
Figure 8B:
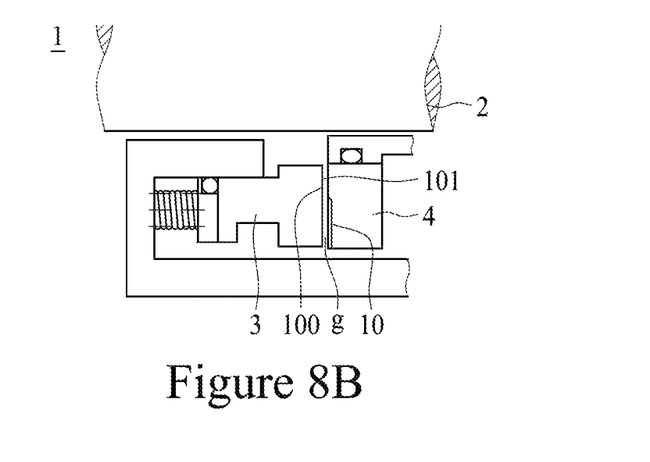

FIG. 8A and FIG. 8B show embodiments in which the shaft sealing device 1 having the groove 10 disposed on the second sealing surface 101 of the rotary member 4 is in the stationary or operational state. In the present embodiment, as the rotating shaft 2 and the rotary member 4 rotate, the gas inside the shaft sealing device 1 is introduced between the first sealing surface 100 and the second sealing surface 101 and into groove 10 of the rotary member 4, and based on the principle similar to that disclosed in FIG. 7A and FIG. 7B, a gap g is formed between the first sealing surface 100 and the second sealing surface 101. As shown in FIG. 8B, the gas inside the shaft sealing device 1 is forced to flow through the gap g by the pressure differential between the inside and the outside of the shaft sealing device 1, so as to form a fluid sealing surface to achieve the sealing effect.

The above embodiments are only used for illustrating the present invention, and the present invention is not limited to these embodiments. The above embodiments can be properly changed without departing the scope of claims of the present invention.

What is claimed is:

1. A shaft sealing device, comprising:
 a stationary member, disposed on a housing of the shaft sealing device and having a first sealing surface;
 a rotary member, corresponding to the stationary member, disposed on the rotating shaft and having a second sealing surface opposite to the first sealing surface; and
 a groove, disposed on the first sealing surface or the second sealing surface, extending inwardly from an outer peripheral edge of the first sealing surface or the second sealing surface, or extending outwardly from an inner peripheral edge of the first sealing surface or the second sealing surface;
 wherein a bottom wall of the groove is part of a sidewall of the groove and extends along a part of an imaginary circle having a same center of curvature as the inner peripheral edge and the outer peripheral edge, and another sidewall of the groove forms a curve with an inflection point; and
 wherein when the groove extends inwardly from the outer peripheral edge, the sidewall of the groove and the another sidewall of the groove extend inwardly from the outer peripheral edge and intersect between the outer peripheral edge and the inner peripheral edge.

2. The shaft sealing device of claim 1, wherein a distance between the bottom wall of the groove and a center of circle of the first sealing surface is substantially from $R_I+0.2(R_O-R_I)$ to $R_I+0.5(R_O-R_I)$, wherein $R_O$ is an outer radius of the first sealing surface, and $R_I$ is an inner radius of the first sealing surface.

3. The shaft sealing device of claim 1, wherein the groove further includes a first region and a second region, the first region includes a first left sidewall and a first right sidewall, the second region includes a second left sidewall and a second right sidewall, the first left sidewall and the first right sidewall are respectively connected to the second left sidewall and the second right sidewall, and the first right sidewall and the second right sidewall are respectively formed by rotating the first left sidewall and the second left sidewall by an angle with respect to a center of curvature of the inner peripheral edge or the outer peripheral edge.

4. The shaft sealing device of claim 3, wherein an intersection of the first left sidewall and the outer peripheral edge or the inner peripheral edge is defined as a reference point, an angular displacement from the reference point to an intersection of the second left sidewall and the bottom wall with respect to the center of circle of the first sealing surface or the second sealing surface is greater than an angular displacement from the reference point to an intersection of the first left sidewall and the second left sidewall with respect to the center of circle of the first sealing surface or the second sealing surface.

5. The shaft sealing device of claim 3, wherein an intersection of the first left sidewall and the outer peripheral edge or the inner peripheral edge is defined as a reference point, an angular displacement from the reference point to an intersection of the second right sidewall and the bottom wall with respect to the center of circle of the first sealing surface or the second sealing surface is more than twice an angular displacement from the reference point to an intersection of the first right sidewall and the outer peripheral edge or the inner peripheral edge with respect to the center of circle of the first sealing surface or the second sealing surface.

6. The shaft sealing device of claim 1, wherein the groove has a depth substantially in a range from 0.001 to 0.5 mm.

7. The shaft sealing device of any of claims 1 to 6, comprising a plurality of the grooves arranged in a circle along the outer peripheral edge or the inner peripheral edge.

8. The shaft sealing device of claim 7, wherein a central angle of each of the grooves at the outer peripheral edge or the inner peripheral edge of the first sealing surface or the second sealing surface is 360°/(2*NB), wherein NB is a total number of the grooves.

9. The shaft sealing device of claim 1, wherein the inflection point is formed at a central position in a radial direction of the bottom wall of the groove and the outer peripheral edge, or a central position in the radial direction of the bottom wall of the groove and the inner peripheral edge.

10. The shaft sealing device of claim 1, wherein the inflection point is shifted toward the bottom wall or the outer peripheral edge with respect to the central position in the radial direction of the bottom wall of the groove and the outer peripheral edge, or shifted toward the bottom wall or the inner peripheral edge with respect to the central position in the radial direction of the bottom wall of the groove and the inner peripheral edge.

11. The shaft sealing device of claim 3, wherein the first region and the second region are formed from the inner peripheral edge or the outer peripheral edge to inside in a tapered manner.

12. A shaft sealing device, comprising:
a stationary member, disposed on a housing of the shaft sealing device and having a first sealing surface;
a rotary member, corresponding to the stationary member, disposed on the rotating shaft and having a second sealing surface opposite to the first sealing surface; and
a groove, disposed on the first sealing surface or the second sealing surface, extending inwardly from an outer peripheral edge of the first sealing surface or the second sealing surface, or extending outwardly from an inner peripheral edge of the first sealing surface or the second sealing surface;
wherein a bottom wall of the groove extends along a part of an imaginary circle having a same center of curvature as the inner peripheral edge and the outer peripheral edge, and a sidewall of the groove forms a curve with an inflection point;
wherein the groove includes a first region including a first left sidewall and a first right sidewall, and concave curves of the first left sidewall and the first right sidewall are concave toward a first direction.

13. The shaft sealing device of claim 12, wherein the groove includes a second region including a second left sidewall and a second right sidewall, the first left sidewall and the first right sidewall are respectively connected to the second left sidewall and the second right sidewall, and concave curves of the second left sidewall and the second right sidewall are concave toward a second direction.

14. The shaft sealing device of claim 13, wherein the first direction and the second direction are reverse.

15. The shaft sealing device of claim 13, wherein the first region and the second region have a first depth and a second depth respectively, and are formed from the outer peripheral edge or the inner peripheral edge to inside in a step-like manner.

* * * * *